United States Patent [19]

Yamai et al.

[11] Patent Number: 4,736,279
[45] Date of Patent: Apr. 5, 1988

[54] VEHICLE LAMP DEVICE TO BE MOUNTED ON A SPOILER

[75] Inventors: Yoshihiro Yamai, Toyota; Etsuo Kotaki, Urayasu, both of Japan

[73] Assignees: Toyota Motor Corporation, Aichi; Stanley Electric Co., Ltd., Tokyo, both of Japan

[21] Appl. No.: 838,377

[22] Filed: Mar. 11, 1986

[30] Foreign Application Priority Data

Mar. 14, 1985 [JP] Japan ................................. 60-36673
Mar. 14, 1985 [JP] Japan ................................. 60-36674

[51] Int. Cl.⁴ .............................................. B60Q 1/00
[52] U.S. Cl. ...................................... 362/80; 362/396; 362/370; 340/87
[58] Field of Search ................... 362/61, 80, 370, 396, 362/368; 340/97, 69, 84, 87, 135

[56] References Cited

U.S. PATENT DOCUMENTS

| 267,202 | 12/1982 | Potts | D26/35 |
| 3,735,116 | 5/1973 | Morrison | 362/61 |
| 4,488,141 | 12/1984 | Ohlenforst et al. | 340/97 |
| 4,591,954 | 5/1986 | Kawamura et al. | 362/61 |
| 4,626,967 | 12/1986 | Segoshi | 362/61 |

FOREIGN PATENT DOCUMENTS

| 0051086 | 5/1982 | European Pat. Off. | 362/61 |
| 1245772 | 7/1967 | Fed. Rep. of Germany | 362/368 |
| 3017405 | 11/1981 | Fed. Rep. of Germany | 340/69 |
| 0038230 | 2/1985 | Japan | 340/87 |
| 2113157 | 8/1983 | United Kingdom | 340/135 |

Primary Examiner—E. Rollins Cross
Assistant Examiner—D. M. Cox
Attorney, Agent, or Firm—Frishauf, Holtz, Goodman & Woodward

[57] ABSTRACT

A lamp device to be mounted on a spoiler of a motor vehicle, in which a housing for mounting a light source therein is integrally formed with a protective cover in a recessed manner in the front side of said protective cover. A front lens is arranged detachably at the front side of the housing.

25 Claims, 2 Drawing Sheets

VEHICLE LAMP DEVICE TO BE MOUNTED ON A SPOILER

BACKGROUND OF THE INVENTION

The present invention relates to a vehicle lamp device, such as a stop lamp, a blinking light or a tail lamp, to be mounted on a spoiler of a motor vehicle.

DESCRIPTION OF PRIOR ART

Normally, a rear combination lamp device is mounted at the rear of a motor vehicle, and normally comprises a combination set of blinker lamps, tail lamps and stop lamps, etc. In addition, in order to improve prevention of rear-end collisions, other stop lamps are often additionally installed. Such additional stop lamps are mainly provided in the rear window and, when the brake is activated, are lighted up together with the normal stop lamps. The lighting of the additional window mounted stop lamps takes place at rather high position, thereby quickly alarming following motor vehicles with a higher visibility, thereby effectively preventing rear-collisions and other dangers.

Such additional stop lamps may sometimes be provided on a spoiler mounted at the rear of a motor vehicle. Such spoiler mounted stop lamp devices comprise a lamp body and a protective cover. The protective cover is fixed on the rear face of the spoiler. The lamp body comprises a housing that supports a bulb and a front lens. The protective cover is generally formed like a box having an opening to house said lamp body. In addition, lamp bases are provided on both sides near the opening.

When the lamp body and protective cover are assembled, the housing of the lamp body and the front lens are inserted from the opening side of the protective cover. Then, the housing and the front lens must be superposed against said lamp bases for positioning, and then fixed by screwing. Accordingly, the assembling work becomes laborious while increasing the number of parts because the housing, the front lens and the protective cover are separately constructed. Furthermore, parts control becomes more complicated.

OBJECTS OF THE INVENTION

A major object of the present invention is to simplify the structure of a lamp device to be mounted on a spoiler of a vehicle, while reducing the number of parts and making assembly work easier.

Another object of the present invention is to hide the fixing screws of the lamp device mounted on the spoiler, thereby presenting a lamp device for motor vehicles having a beautiful appearance in the mounted state.

SUMMARY OF THE INVENTION

The present invention relates to a lamp device to be mounted on a spoiler of a vehicle, wherein a housing unit on which a light source is mounted is constructed in one body by mounting the housing in a recessed manner in the front side of a protective cover, and a front lens is attached in a detachable manner in the front of the housing.

DETAILED DESCRIPTION

Figure 1:
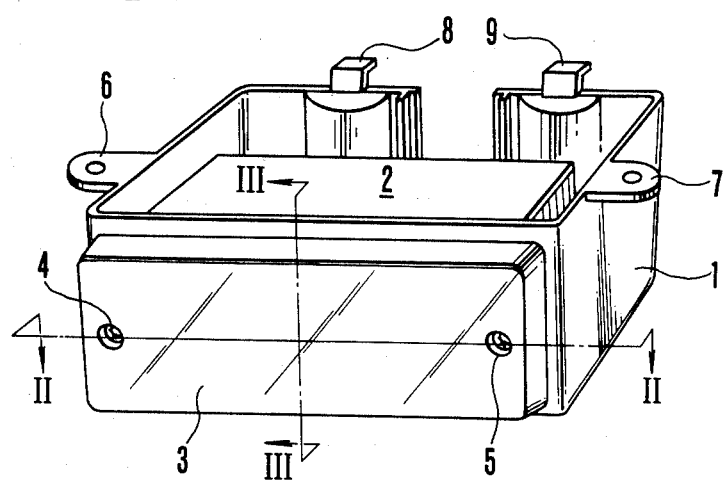
FIG. 1 is a front side oblique view of an embodiment of the lamp device for motor vehicles according to the invention.
Figure 2:
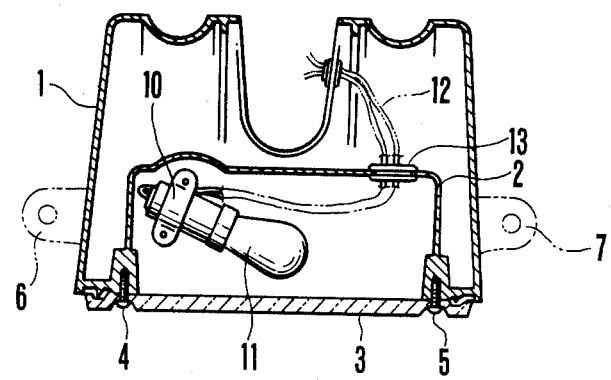
FIG. 2 is a sectional view taken along line II—II in FIG. 1.
Figure 3:
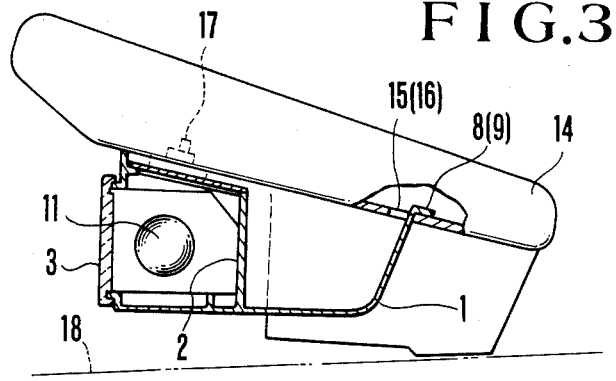
FIG. 3 is a sectional view taken along line III—III in FIG. 1 in which the device is installed on a spoiler.

Regarding the embodiment shown in FIGS. 1-3, a protective cover 1 (constituting a lamp device) is molded from synthetic resin in one body with housing unit 2 for the lamp body. The housing unit 2 is formed in a recessed manner at the front side of the protective cover 1. In the front side of the housing unit, a front lens 3 can be mounted in a detachable manner by means of screws 4, 5, etc. In addition, a pair of mounting bases or tabs 6, 7 are integrally formed on the upper edges of both sides of the protective cover 1, for mounting the device onto a spoiler. In addition, a pair of mounting hook pieces 8, 9 are integrally formed in the rear side of cover 1.

In the housing 2, a bulb 11 (a light source) is fixed by a mounting means 10 such as fixing metal piece. A wire 12, for supplying power to said light source 11, is wired through a hole in a wall face of housing unit 2. A hole is drilled through the wall face, and then a rubber bush 13 is engaged in said hole as a wiring bushing.

In a thus formed lamp device, protective cover 1 is integrally formed with (i.e., molded with) housing unit 2 in one body, so that these are treated as one part. After light source 11 is mounted in housing unit 2, the assembling work of said lamp device can be finished only by mounting front lens 3.

Where a lamp device, after being assembled in the above manner, is to be mounted on a spoiler 14, notched holes 15 (16) are provided beforehand in the spoiler 14 at the mounting position in the bottom spoiler side as shown in FIG. 3. First, the hook pieces 8, 9 are engaged with the respective notched holes 15 (16). Then the lamp device is fixed by means of suitable bolts 17 through said bases or tabs 6, 7. In FIG. 3, 18 designates the body of an automobile.

Figure 4:
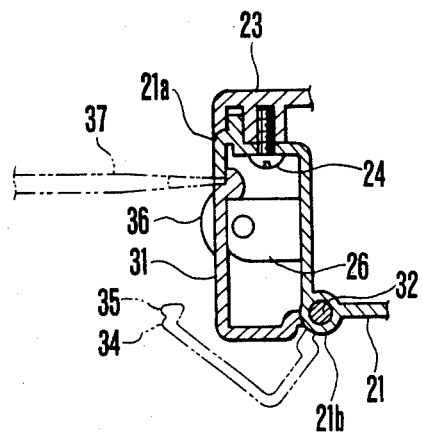
FIG. 4 shows a cross-section of only essential parts of another embodiment of the invention.
Figure 5:
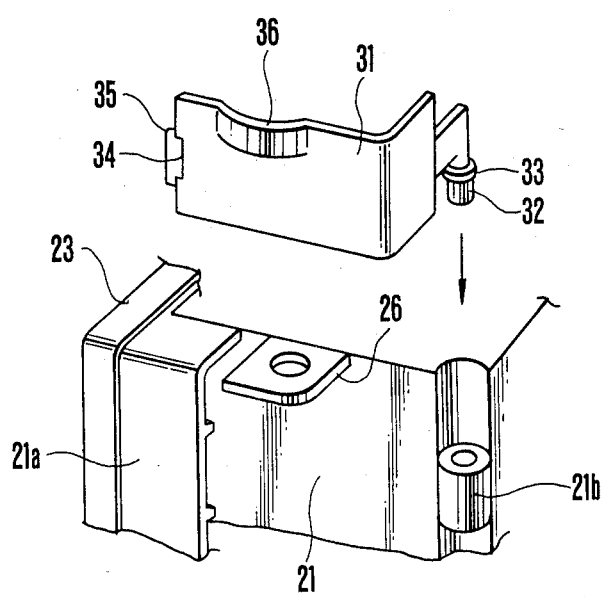
FIG. 5 is an oblique exploded view of the essential parts of the embodiment of FIG. 4.

According to another embodiment shown in FIGS. 4 and 5, where a lamp device is mounted on a spoiler, the mounting bolt is concealed after the lamp device is mounted on the spoiler. Namely, the feature of the embodiment of FIGS. 4 and 5 is that a mounting base or tab 26 formed on both sides of protective cover 21 is hidden by cover 31 from the side face. Protective cover 21 is integrally molded with an outer frame unit 21a, corresponding to the height of said base 26, on the side face in the front side. In the rear side, a supporting unit or bearing 21b is formed in one body, in the corner part in the rear side. Thus, front lens 23 is fixed with screw 24, from the interior (see FIG. 4), in the front side of the outer frame unit 21a.

On the other end of cover 31, a supporting shaft 32 is mounted, which is engaged in the bearing unit 21b in a freely rotatable manner. A flange 33 is provided at the root of supporting shaft 32 in order to permit quick rotation of the supporting shaft 32 and to determine the mounting position of cover 31 in the vertical direction. On the other end of cover 31, pawl or lock tab 35 is integrally formed via a step 34. A protrusion 36 conforms in shape to the base 26, as seen in FIG. 4. A screwdriver 37 is shown in FIG. 4 engaging step 34 to open cover 31.

As described above, cover 31 is mounted in a freely openable manner. The cover 31 is opened before the lamp device is mounted or removed to/from the spoiler. After the lamp device is mounted, the device can be maintained at stable covering conditions by engaging pawl or lock tab 35 which is fixed on the other end of cover 31, with the edge of outer frame 21a located in the front side of protective cover 21. When cover 31 is opened, step 34 is pushed from the outside by means of, for example, a screw-driver 37 for disengaging pawl or lock tab 35, thereby opening cover 31 very easily.

In the embodiment of FIGS. 4 and 5, mounting screws for mounting the lamp device onto the spoiler are effectively concealed so as to exhibit a beautiful exterior in the mounted condition. Also, the screws 24 for mounting the front lens 23 to the outer frame unit 21a are concealed by cover 31, as seen in FIG. 4.

According to the principles of the present invention, a housing unit in which a light source is mounted is formed in the front side of a protective cover in a recessed manner, and the front lens is mounted at the front side of the housing unit in a detachable manner. In consequence, the housing unit can be formed simply because the housing unit is previously attached to the protective cover (i.e., by integral molding). Therefore, assembly work can be done more easily. In addition, the protective cover is provided with a pair of base seats or tabs to be mounted on a spoiler, on both sides of the cover, together with a hook unit at the rear side. Consequently, the hook unit is first engaged, then the base seats are screwed to the spoiler. Accordingly, the mounted condition is very stable, while allowing very easy installation operations.

In addition, in the embodiment of FIGS. 4 and 5, the base seats provided at both sides of the protective cover are hidden by an openable cover to prevent the exposure of the base seats. The openable cover has a supporting shaft at one end and a pawl or lock tab at the other end, the supporting shaft being engaged rotatably in a supporting part or bearing part provided in the protective cover. Also, the pawl or lock tab is engaged in the interior of the outer frame unit of the protective cover. Thus, the protective cover can be stably mounted to the spoiler, and the openable cover hides the mounting screws or bolts for a more beautiful mounted appearance. Also, the openable cover hides the screws holding the front lens to the outer frame unit of the protective cover.

What is claimed is:

1. A lamp device to be mounted on an outside surface of a spoiler of a motor vehicle, comprising:
   a protective cover;
   mounting means including at least one mounting base integrally formed as one non-detachable piece with said protective cover and extending from said protective cover for mounting said protective cover on said outside surface of a spoiler; a housing integrally formed in one non-detachable piece with said protective cover, said housing being recessed in a front side of said protective cover, said protective cover covering a substantial portion of said housing to protect said housing from the outside;
   a light source mounted on said housing; and
   a front lens detachably mounted at a front side of said housing.

2. The lamp device of claim 1, wherein said protective cover, said at least one mounting base, and said housing are integrally molded as one unit from synthetic resin.

3. The lamp device of claim 1, wherein said mounting means comprises two mounting bases integrally formed on respective opposite sides of said protective cover and extending from respective opposite sides of said protective cover.

4. The lamp device of claim 3, comprising a respective openable cover mounted on both respective sides of said protective cover for concealing said mounting bases when said openable covers are in a closed condition.

5. The lamp device of claim 1, wherein said front lens is detachably mounted to said front side of said housing by means of removable screws.

6. The lamp device of claim 4, wherein said front lens is detachably mounted to said front side of said housing by means of removable screws.

7. The lamp device of claim 6, wherein said removable screws extend through side portions of said protective cover and thread into said front lens in a direction toward the front of said front lens, said removable screws being covered by said openable covers when said openable covers are in said closed condition.

8. The lamp device of claim 7, wherein said openable covers assume an open position to gain access to said removable screws to thereby remove said lens.

9. The lamp device of claim 3, wherein said mounting means further comprises at least one hook member integrally formed as one piece with said protective cover at a rear portion of said protective cover for engagement with a hook engaging means of said spoiler.

10. The lamp device of claim 9, wherein said hook engaging means of said spoiler comprises at least one opening into which said at least one hook member is engageable.

11. The lamp device of claim 10, comprising at least two of said hook member, and at least two corresponding openings in said spoiler for respectively receiving a hook members.

12. The lamp device of claim 11, wherein said hook members are completely recessed in said spoiler when received in said openings to thereby conceal said hook members when said lamp device is mounted to a spoiler.

13. A lamp device to be mounted on a spoiler of a motor vehicle, comprising:
- a protective cover;
- mounting bases formed on both sides of said protective cover for mounting said protective cover to a spoiler;
- a housing formed in a recessed manner in a front side of said protective cover;
- a light source mounted on said housing;
- a front lens detachably mounted at a front side of said housing; and
- respective openable side covers mounted on both respective sides of said protective cover for concealing said mounting bases when said openable side covers are in a closed condition.

14. The lamp device of claim 13, wherein said protective cover, said mounting bases, and said housing are integrally formed as one unit from synthetic resin.

15. The lamp device of claim 13, wherein said front lens is detachably mounted to said front side of said housing by means of removable screws.

16. The lamp device of claim 15, wherein said removable screws extend through side portions of said protective cover and thread into said front lens in a direction toward the front of said front lens, said removable screws being covered by said openable covers when said openable covers are in said closed condition.

17. The lamp device of claim 16, wherein said openable covers assume an open position to gain access to said removable screws to thereby remove said lens.

18. The lamp device of claim 13, wherein said mounting means further comprises at least one hook member integrally formed as one piece with said protective cover at a rear portion of said protective cover for engagement with a hook engaging means of said spoiler.

19. The lamp device of claim 18, wherein said hook engaging means of said spoiler comprises at least one opening into which said at least one hook member is engageable.

20. The lamp device of claim 19, comprising at least two of said hook members, and at least two corresponding openings in said spoiler for respectively receiving a hook member.

21. The lamp device of claim 20, wherein said hook members are completely recessed in said spoiler when received in said openings to thereby conceal said hook members when said lamp device is mounted to a spoiler.

22. A lamp device to be mounted on a spoiler of a motor vehicle, comprising:
- a protective cover;
- mounting bases formed on both sides of said protective cover for mounting said protective cover to a spoiler;
- a housing formed in a recessed manner in a front side of said protective cover;
- a light source mounted on said housing;
- a front lens detachably mounted at a front side of said housing; and
- at least one hook member integrally formed as one piece with said protective cover at a rear portion of said protective cover for engagement with a hook engaging means of the spoiler.

23. The lamp device of claim 22, wherein said hook engaging means of said spoiler comprises at least one opening into which said at least one hook member is engageable.

24. The lamp device of claim 23, comprising at least two of said hook members, and at least two corresponding openings in said spoiler for respectively receiving a hook member.

25. The lamp device of claim 24, wherein said hook members are completely recessed in said spoiler when received in said openings to thereby conceal said hook members when said lamp device is mounted to a spoiler.

* * * * *